(12) United States Patent
Vatanapanpilas et al.

(10) Patent No.: US 9,408,140 B2
(45) Date of Patent: Aug. 2, 2016

(54) USING PROXIMATE ACCESS POINTS TO ENSURE FAST WI-FI NETWORK DISCOVERY AND RECONNECTION WITH REDUCED POWER CONSUMPTION

(71) Applicant: Apple Inc., Cupertino, CA (US)

(72) Inventors: Songkran Vatanapanpilas, Santa Clara, CA (US); Naresh Kumar Chinnathambi Kailasam, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 545 days.

(21) Appl. No.: 13/733,786

(22) Filed: Jan. 3, 2013

(65) Prior Publication Data

US 2014/0185599 A1 Jul. 3, 2014

(51) Int. Cl.
*H04W 48/20* (2009.01)
*H04W 64/00* (2009.01)
*H04W 84/12* (2009.01)

(52) U.S. Cl.
CPC .............. *H04W 48/20* (2013.01); *H04W 64/00* (2013.01); *H04W 84/12* (2013.01); *Y02B 60/50* (2013.01)

(58) Field of Classification Search
CPC .............................. H04W 48/20; H04W 88/02
See application file for complete search history.

(56) References Cited

U.S. PATENT DOCUMENTS

2008/0198811 A1\* 8/2008 Deshpande et al. .......... 370/332
2009/0098869 A1\* 4/2009 Torrance et al. ........... 455/426.1
2014/0056192 A1\* 2/2014 Meylan et al. ................ 370/311

OTHER PUBLICATIONS

"Wi-Fi", *Wikipedia, the free encyclopedia*, <https://en.wikipedia.org/wiki/Wi-Fi>, date accessed: Feb. 4, 2016; 16 pages.
"Wi-Fi", *Wikipedia, the free encyclopedia*, <https://web.archive.org/web/20130101200046/http://en.wikipedia.org/wiki/Wi-Fi>, date accessed: Feb. 16, 2016; 16 pages.

\* cited by examiner

*Primary Examiner* — Dang Ton
*Assistant Examiner* — Kevin Lee
(74) *Attorney, Agent, or Firm* — Sterne, Kessler, Goldstein & Fox P.L.L.C.

(57) ABSTRACT

One embodiment of the present invention provides a portable device, which is configured to join a known Wi-Fi network. While the device is not associated with a known access point, the device scans for access points at a scanning frequency wherein information about known access points has been stored in a database in the device. During this scanning process, the device determines whether the device is proximate to a known access point and the device sets the device's scanning frequency based on whether the device is proximate to a known access point.

23 Claims, 5 Drawing Sheets

_US 9,408,140 B2_

USING PROXIMATE ACCESS POINTS TO ENSURE FAST WI-FI NETWORK DISCOVERY AND RECONNECTION WITH REDUCED POWER CONSUMPTION

BACKGROUND

1. Field

The disclosed embodiments generally relate to techniques for connecting to Wi-Fi® networks.

2. Related Art

Smartphone applications, such as email clients and web browsers, often require an available Internet connection as soon as the user launches the application on the device. Such applications then use the connection to access web pages, email, and other online content. Smartphones generally use either a cellular or Wi-Fi connection to access the Internet. Moreover, applications typically prioritize Wi-Fi connections over cellular connections because Wi-Fi is typically cheaper and faster than cellular connectivity. Thus, users benefit when smartphones stay connected to Wi-Fi networks as much as possible.

Implementing this behavior in a device, however, introduces a unique problem, particularly when the mobile device goes outside the range of the Wi-Fi network's access point and loses the device's Wi-Fi connection. In order to regain a Wi-Fi connection to the Internet, the device may need to discover and associate with a Wi-Fi access point that the device "knows" (possesses security credentials for). Once a device leaves the range of an access point, the device may not know how far away the access point is. As a result, the device scans for access points repeatedly at a constant frequency.

However, mobiles devices have limited battery power, and the process of scanning for access points consumes power. Thus, in setting the scanning frequency, the mobile device tries to balance the need to conserve power with the need to regain a Wi-Fi connection as soon as the device is in range of an access point. Setting the scanning frequency too low may prevent the device from quickly discovering an access point once the device is in range. On the other hand, setting the scanning frequency too high may quickly drain the device's battery. Both scenarios degrade the user's experience.

SUMMARY

One embodiment of the present invention provides a portable device, which is configured to join a known Wi-Fi network. While the device is not associated with a known access point, the device scans for access points at a scanning frequency wherein information about known access points has been stored in a database in the device. During this scanning process, the device determines whether the device is proximate to a known access point, and the device sets its scanning frequency based on whether the device is proximate to a known access point.

DETAILED DESCRIPTION

Figure 1:
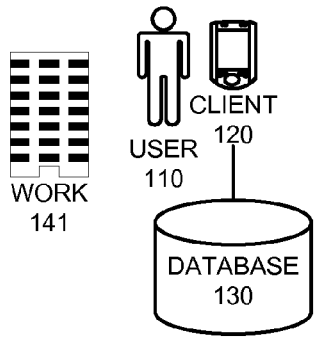
FIG. 1 illustrates a computing environment in accordance with an embodiment of the present invention.
Figure 1:
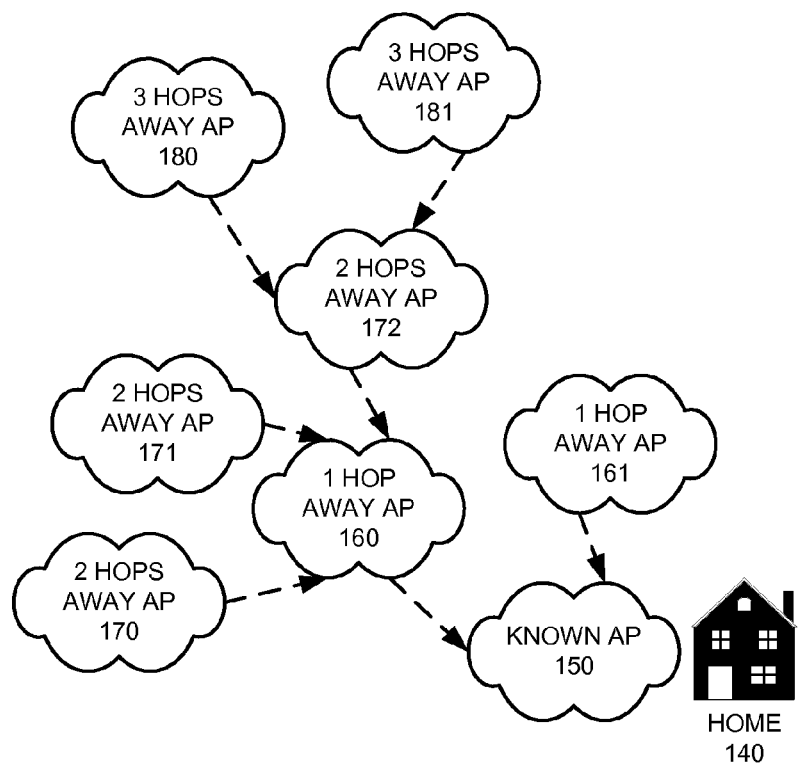

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored on a non-transitory computer-readable storage medium as described above. When a computer system reads and executes the code and/or data stored on the non-transitory computer-readable storage medium, the computer system performs the methods and processes embodied as data structures and code and stored within the non-transitory computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Overview

When a mobile device searches for a known Wi-Fi access point to associate with, embodiments of the present invention seek out Wi-Fi access points that are proximate to a known Wi-Fi access point to determine whether the device itself is proximate to a known access point. By using this determination to set how frequently the device scans for access points, embodiments of the present invention may (1) conserve battery power, and (2) still allow the device to quickly associate with a known access point once that known access point is in range. Note that the term Wi-Fi may refer to systems associated with the IEEE 802.11 standard, which is a set of standards developed for wireless local area network (WLAN) technology. Also note that an access point is "in range" of the device when the device is able to discover the access point, and such access points are referred to as "in-range" access points.

Embodiments of the present invention offer various advantages. After moving in range of a known access point, a device, which embodies the present invention, may take advantage of a Wi-Fi connection sooner. Using existing scanning strategies however, there may a long delay between the time the device enters into range of a known access point and the time the device performs a scan. Typically, the minute-long delay includes three components. The first component comprises the number of seconds the device waits before automatically scanning for access points. For example, if a user comes within range of a known access point and the device has just performed a scan, unless the user manually intervenes, the device may not perform another scan for 45 seconds or longer. The second component comprises the time needed to scan a maximum of 35 WLAN channels in 2.4 and 5.0 GHz bands. The third component comprises the time needed to establish a connection once the device discovers the known access point on one of the 35 channels. Note that the first component comprises the bulk of the delay. Hence, intelligently managing the device's scanning frequency may drastically reduce this component, thereby allowing the device to offload web-related transfers onto a Wi-Fi connection sooner.

In some cases, embodiments of the present invention may also free users from having to manage their devices' Wi-Fi transceivers manually. When a user knows she will be in an area devoid of known access points, she may manually disable her device's Wi-Fi transceiver. By doing so, the user prevents her device from wasting battery power on scans for known access points that simply will not be there. Unfortunately, once she returns within range of a known access point, the device does not associate with the known access point until the user manually re-enables her device's Wi-Fi transceiver. With embodiments of the present invention, when a device is far from known access points, the device may intelligently reduce the scanning frequency so much that the device uses only a small amount of power to perform scanning operations. Thus, the user would be free to leave her device's Wi-Fi transceiver on without fear of wasting battery power.

One embodiment of the present invention provides a portable device, which is configured to join a known Wi-Fi network. While the device is not associated with a known access point, the device scans for access points at a scanning frequency, wherein information about known access points has been stored in a database in the device. Next, the device determines whether the device is proximate to a known access point, and the device sets the device's scanning frequency based on whether the device is proximate to a known access point. Note that embodiments of the present invention may exist as control logic that is coupled to an integrated circuit, and handsets may include this integrated circuit as a component along with other components, such as a radio transceiver and an antenna.

In some embodiments of the present invention, when the device associates with an access point for a WLAN, the device stores information for the access point in the database. The information stored in the database indicates that the access point is a known access point for the WLAN. Note that in general, known access points are access points that the device has previously associated with and can re-associate with to gain a Wi-Fi Internet connection. While the device is associated with the access point, the device continues to scan for other access points opportunistically. This opportunistic scanning can be done while the device (1) is associated with an access point, but (2) is not transferring data. For example, in order to check email, a user may wake up a smartphone while the smartphone is in range of a known access point. The smartphone subsequently associates with the known access point, giving the smartphone's email client Internet access. After the email client finishes downloading the email, the smartphone stops transferring data. Because the connection is idle, the smartphone may scan for in-range access points without disrupting data transfers.

In some embodiments of the present invention, when scanning for access points, the device may perform active scanning by issuing probe requests with the broadcast SSID over a set of WLAN channels. Note that a probe request is a special frame sent by the device on a particular WLAN channel requesting information from either a specific access point, specified by the SSID, or all access points in the area, specified by the broadcast SSID. The device then receives probe responses from in-range access points. Additionally or alternatively, the device may engage in passive scanning where the device passively listens on a channel for beacon frames from in-range access points. Note that the device may perform active or passive scanning under two different schedules: (1) intermittently when the device is not associated with any access point, or (2) opportunistically when the device is associated with a known access point. Also note that a device is "in range" of an access point if the device is able to receive a probe response or a beacon frame from the access point. For example, a smartphone can scan for access points while the smartphone's user is walking down the street. At the same time, a first access point broadcasts a beacon frame to announce the first access point's availability. When the smartphone receives this beacon frame, the smartphone may consider the first access point to be an in-range access point. A short time later, the smartphone, still searching for more access points, broadcasts a probe request frame. A second access point receives the request and issues a probe response frame to the request. When the smartphone receives this response frame, the smartphone may consider the second access point to be an in-range access point as well.

In some embodiments of the present invention, when determining whether the device is proximate to a known access point, the device determines whether any of the in-range access points are known access points or proximate access points. Note that information about proximate access points has been stored in the database.

In some embodiments of the present invention, a proximate access point neighbors either a known access point or another access point that is less than h hops away from a known access point. Note that a first access point "neighbors" a second access point if a physical location exists where the device can be in range of both access points simultaneously. Also, note that if the device is in range of a known access point, then the device is proximate to the known access point. However, the device may not be in range of a known access point even if the device is proximate to a known access point. In an example where h has the value of three, a smartphone broadcasts a probe request while scanning for in-range access points. Next, the smartphone receives responses from in-range access points that decide to respond. If this group of responders contains a known access point, an access point that neighbors a known access point, or an access point that is two hops away from a known access point, the device is proximate to a known access point.

In some embodiments of the present invention, the set of WLAN channels may comprise all WLAN channels that conform to the IEEE 802.11 standard or a subset thereof. Also, note that when scanning for access points, the device may order the channels in different ways including consecutively, randomly, or by prioritizing channels where known access points were last discovered.

In some embodiments of the present invention, the device does the following when scanning for access points. If the responses include a response from a known access point, the device stores or updates information in the database for any in-range access point that responds. The information stored comprises the known access point's BSSID and indicates that the in-range access point is proximate to a known access point.

For example, a smartphone that is associated with a known access point opportunistically scans for in-range access points by sending out a probe request. For each of the responders, the smartphone performs the following steps. First, the smartphone performs a lookup within a local database to determine whether the device has already recorded information for the access point. If not, the smartphone records information about the responding access point in a new database entry. This information indicates that this responding access point is proximate to this known access point and is therefore a "proximate access point." Additionally, by including the known access point's BSSID in the new database entry, the smartphone can easily determine that the responding access point is only one hop away from a known access point.

However, if the responses do not include a response from a known access point but include a response from an access point that is less than h hops away from a known access point, the device stores or updates information in the database for any in-range access point that responds. Here, the information stored includes the BSSID of the access point that is less than h hops away from the known access point and indicates that the in-range access point is proximate to a known access point.

In an example where h equals three, a smartphone that is not associated with a known access point scans for in-range access points by sending out a probe request. After the smartphone has gathered responses from in-range access points, the smartphone determines whether at least one of the responders is an access point that is less than three hops away from a known access point. If so, for each of the responders, the smartphone performs the following. First, the smartphone performs a lookup within the smartphone's database to determine whether the smartphone previously recorded information for the access point. If not, the smartphone records information about the responding access point in a new database entry. This information indicates that this access point is proximate to this known access point and is therefore a "proximate access point." Additionally, by including the BSSID of the access point that is less than three hops away from a known access point in the new database entry, the smartphone can easily determine that the responding access point is no more than three hops away from a known access point.

In cases where the device has already stored information about the responding access point in the database, the device may consult a number of parameters when deciding whether to overwrite the entry with current information. These parameters include, but are not limited to: the entry's timestamp, the current signal strength of the responding access point, the signal strength of the responding access point recorded in the entry, the current number of hops between the responding access point and the known access point, the number of hops between the responding access point and the known access point recorded in the entry, and comparisons with other database entries. For example, the device may decide to overwrite the entry if the entry's timestamp is too old. In another example, the device may decide to overwrite the entry only if the newly calculated number of hops is less than the number of hops stored in the database entry.

In some embodiments of the present invention, the device does the following when setting the scanning frequency based on whether the device is proximate to a known access point. If the device is proximate to a known access point, the device restores the scanning frequency to an initial scanning frequency $f_{initial}$. However, if the device is not proximate to a known access point and the scanning frequency is greater than a minimum scanning frequency $f_{min}$, the device does the following. If a counter is equal to an integer c, the device reduces the scanning frequency and sets the counter to zero. Otherwise, if the counter is less than c, the device increments the counter.

In some embodiments of the present invention, $f_{initial}$, $f_{min}$, and c depend on h. Note that lowering the value of h may decrease the size of the geofence around a known access point where the device can detect its proximity to the known access point. In other words, if a user is traveling toward a known access point, the smaller geofence translates to a smaller window of time where the device can detect its proximity to a known access point and, in response to this proximity, increase the scanning frequency. If $f_{min}$ is too low, the device may completely miss this window. Thus, the device may base $f_{min}$ inversely on h so that if h is low, $f_{min}$ is higher, the device scans more often, and a scan is more likely to occur during this window of time.

In some embodiments of the present invention, information about a known access point comprises the access point's BSSID, SSID, and channel. Additionally, information about a proximate access point comprises the access point's BSSID, SSID, channel, RSSI information, and a BSSID of a neighboring access point. Because information for a single access point may be stored as a single entry in the database, the device may limit the number of remembered access points to keep database lookups fast. Note that the device may forgo storing the SSID and rely solely upon the BSSID as the primary means to identify an access point.

In some embodiments of the present invention, the device may rely on a remote server that stores BSSIDs across the world to determine whether a particular access point is proximate to a known access point. The device may communicate with the remote server via a non-Wi-Fi connection. In addition, the device may send the BSSID of the particular access point and the BSSIDs of all known access points to the remote server. The remote server then tells the device whether the access point is proximate to a known access point or not.

In some embodiments of the present invention, rather than discover proximate access points manually through scanning Wi-Fi channels, the device may preload, from a remote server, the locations of all access points that are geographically close to the known access point that is associated with the device. For example, while the device is currently connected to a known access point, the device may use the Wi-Fi connection to send the BSSID of the known access point and h to the remote server. The remote server may then respond to the device with the BSSIDs and locations of all access points that are proximate to the known access point with respect to h. By storing this information within the database, the device will know all access points that are proximate to the known access point with respect to h, which saves the device the trouble of having to manually build its database of proximate access points.

Computing Environment

FIG. 1 illustrates the computing environment 100 of a device user 110 in accordance with an embodiment of the present invention. Computing environment 100 includes a number of computer systems, which may include any type of computer system based on a microprocessor, a mainframe computer, a digital signal processor, a portable computing device, a personal organizer, a device controller, or a smartphone. More specifically, referring to FIG. 1, computing environment 100 includes user 110, client 120, database 130, locations 140-141, known access point 150, access points 160-161, 170-172, and 180-181. Note that access points 160-161 neighbor known access point 150, access points 170-172 neighbor access point 160, and access points 180-181 neighbor access point 172.

Client 120 may include any node on a network including computational capability and a mechanism for joining a Wi-Fi network, such as a smartphone, a PDA, a tablet computer, or a laptop computer.

User 110 may include an individual, a group of individuals, an organization, a group of organizations, a computing system, a group of computing systems, or any other entity that can interact with computing environment 100.

Database 130, which resides within client 120, may include any type of system for storing data in non-volatile storage. This includes, but is not limited to, relational database management systems, text files, XML files, and spreadsheets. This also includes, but is not limited to, systems based upon magnetic, optical, or magneto-optical storage devices, as well as storage devices based on flash memory and/or battery-backed up memory. Note that client 120 may couple database 130 to a server, to a client, or directly to a network.

Locations 140-141 may include any location in user 110's commute where known access points can be found, including homes, train stations, proprietary businesses, libraries, and offices. Such known access points may provide free public Wi-Fi, non-free public Wi-Fi, or private Wi-Fi that is accessible only to user 110.

Known access point 150 may include any access point that client 120 has previously associated with in the past. The known access point may not require a security key from client 120 because the known access point provides unencrypted Wi-Fi. Alternatively, the known access point may require client 120 to remember a security key in order to rejoin because the known access point provides only encrypted Wi-Fi. Note that client 120 cannot associate with access points 160-161, 170-172, or 180-181 because client 120 does not have the requisite security key.

Note that different embodiments of the present invention may use different system configurations, and are not limited to the system configuration illustrated in computing environment 100.

System

Figure 2:
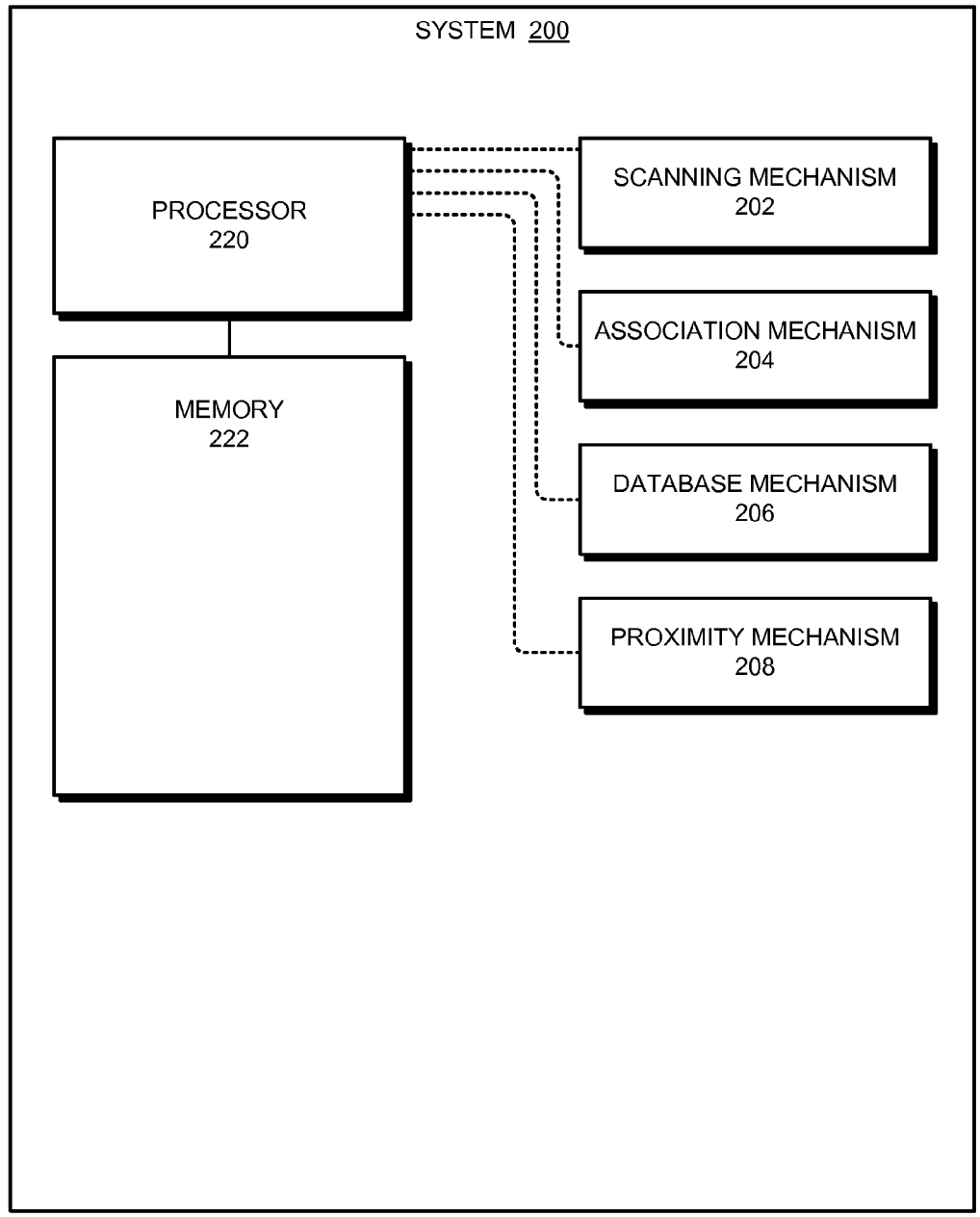
FIG. 2 illustrates a system in accordance with an embodiment of the present invention.

FIG. 2 illustrates a system 200 in accordance with an embodiment of the present invention. As illustrated in FIG. 1, system 200 may comprise client 120, database 130, known access point 150, or any combination thereof. System 200 may also include scanning mechanism 202, association mechanism 204, database mechanism 206, proximity mechanism 208, processor 220, and memory 222. Client 120 may use (1) scanning mechanism 202 to scan for all access points 150, 160-161, 170-172, and 180-181, (2) association mechanism 204 to join known access point 150, (3) database mechanism 206 to interact with database 130, and (4) proximity mechanism 208 to determine whether an access point is proximate to a known access point.

Using Proximate Access Points to Conserve Power

Figure 3:
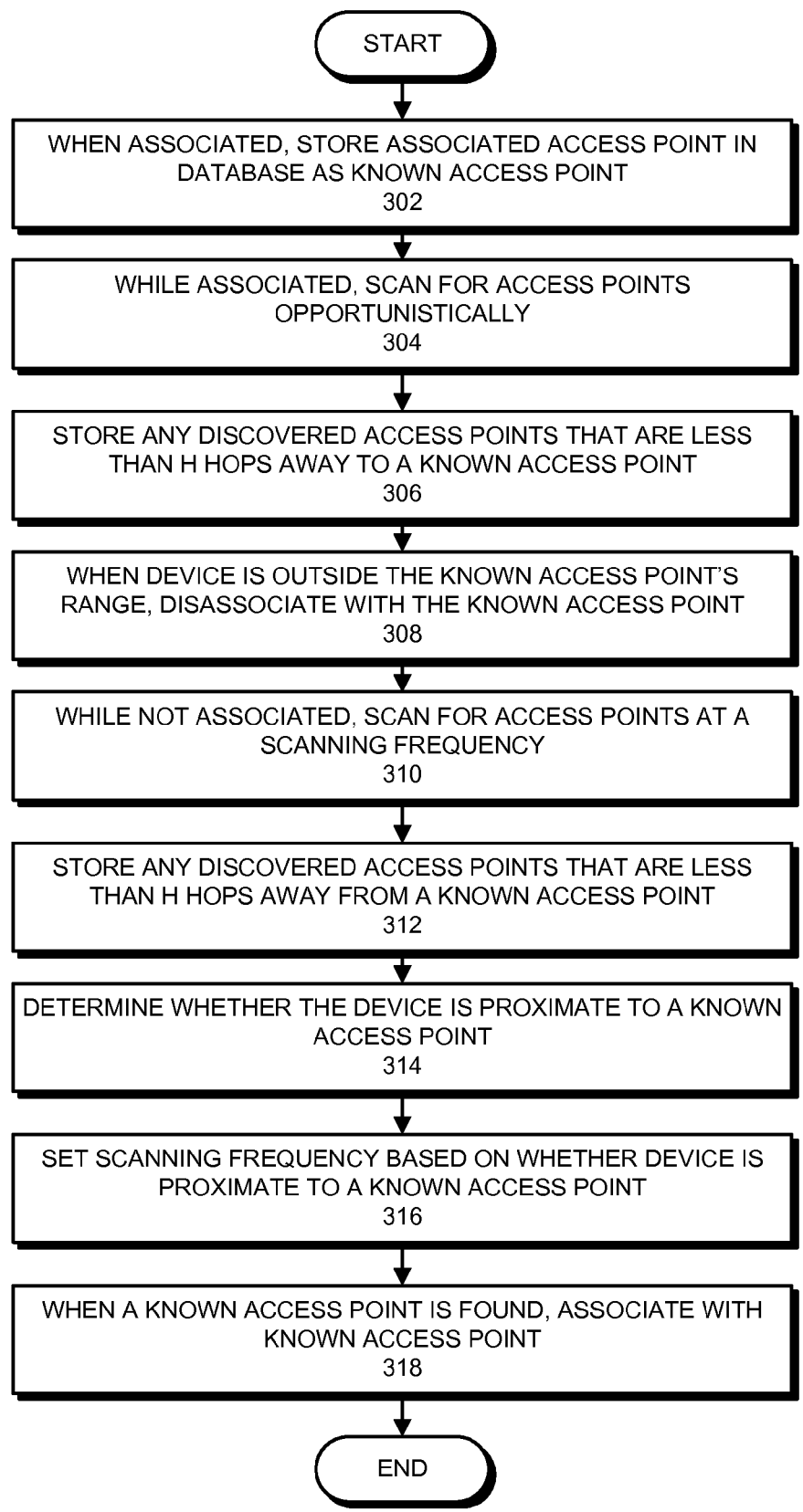
FIG. 3 presents a flow chart illustrating the process of using proximate access points (APs) to ensure fast Wi-Fi network discovery and reconnection with reduced power consumption in accordance with an embodiment of the present invention.
Figure 4:
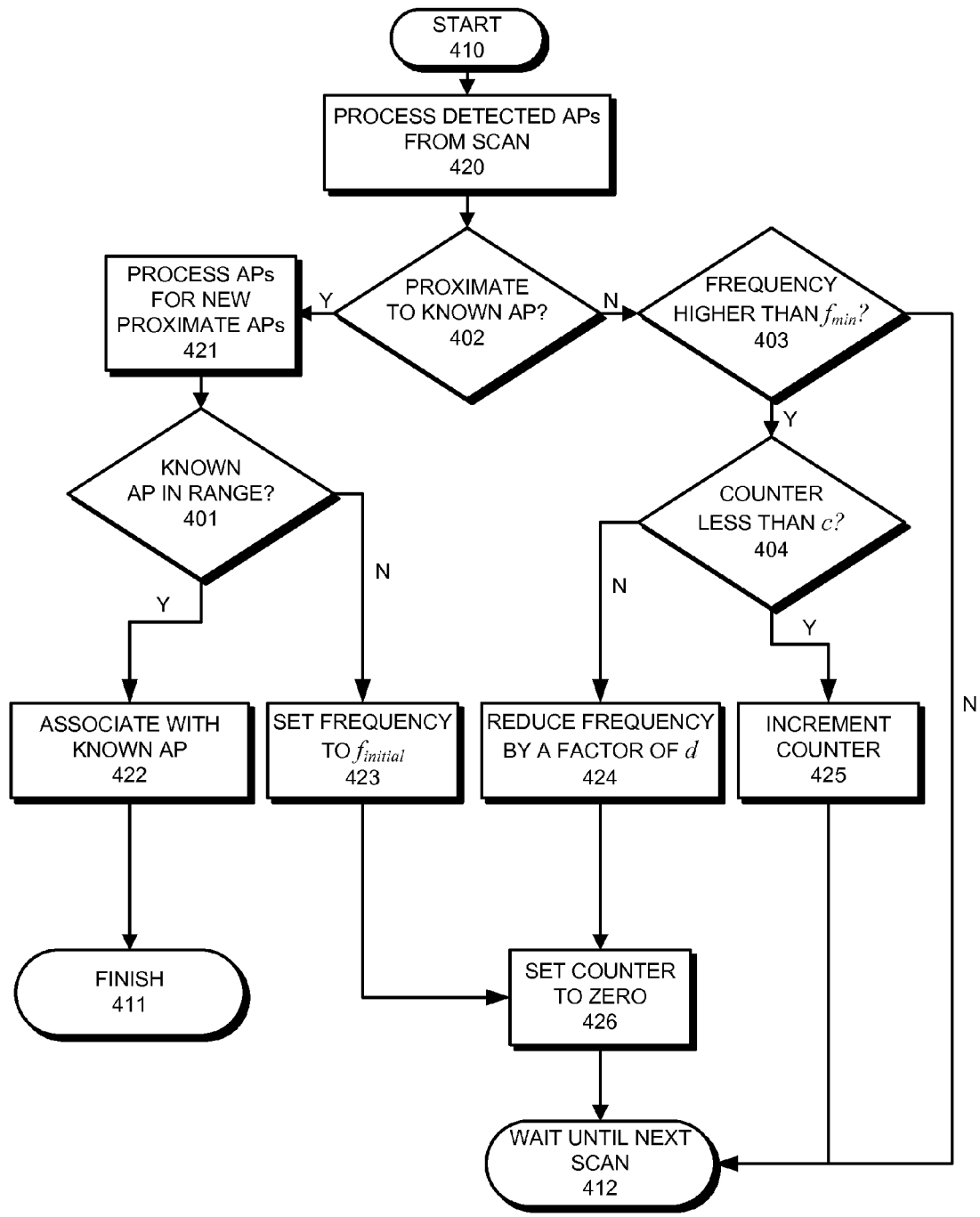
FIG. 4 presents a flow chart illustrating the process of setting the scanning frequency based on whether the device is proximate to a known access point (AP) in accordance with an embodiment of the present invention.
Figure 5:
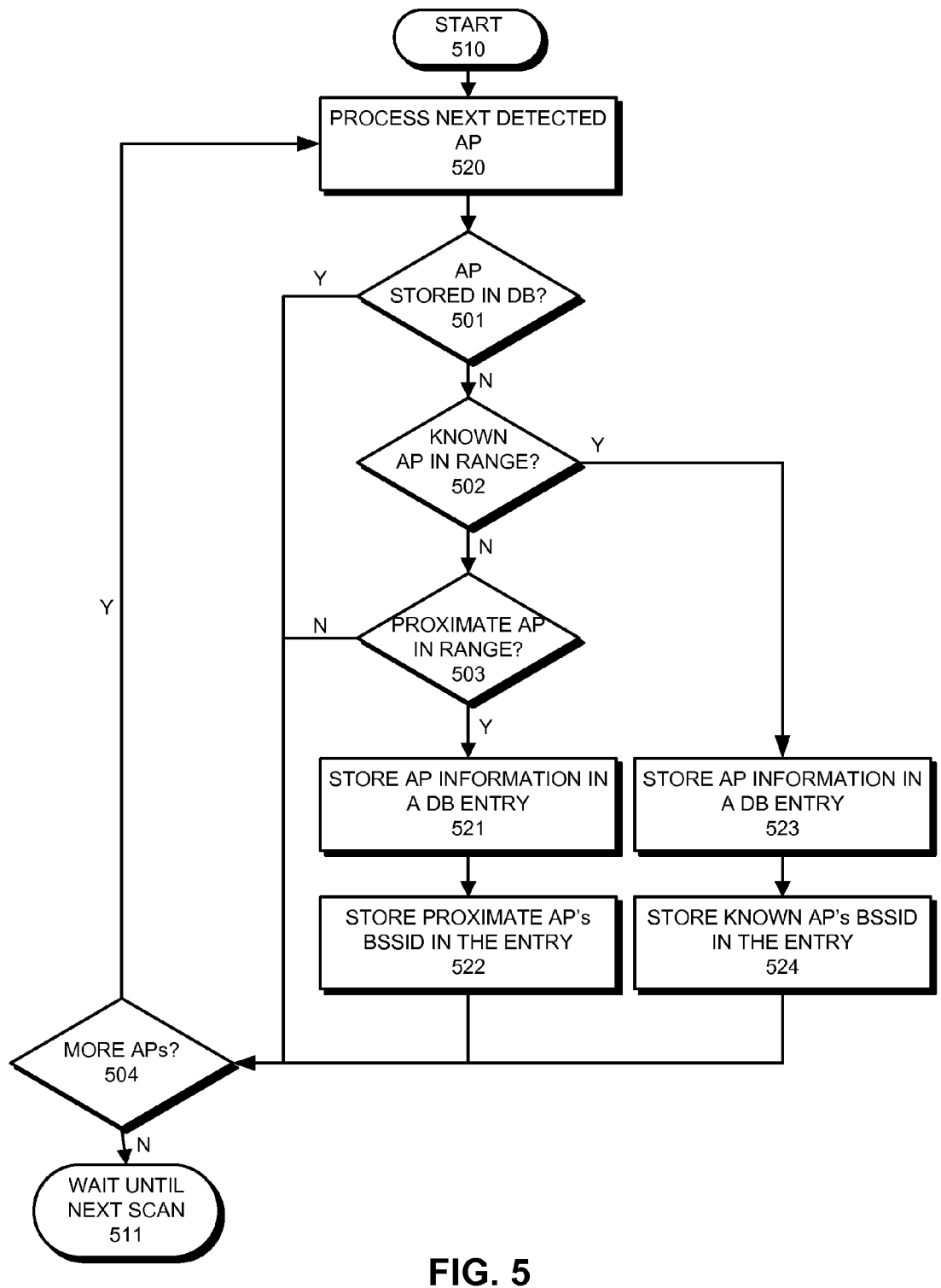
FIG. 5 presents a flow chart illustrating how the device processes access points (APs) that respond to the device's broadcasted probe request in accordance with an embodiment of the present invention.

The next three figures explain how a device populates the device's local database with information about proximate access points and uses the information to manage the client's scanning frequency. FIG. 3 presents a flow chart that illustrates how the device needs to populate the local database, both while associated and while not associated with a known access point before the device can manage the scanning frequency. Next, FIG. 4 illustrates how the device adjusts the scanning frequency after each scan. Finally, FIG. 5 provides more detail on how client 120 populates database 130.

In FIG. 3, while the device is associated with a known access point, the device may store information about the known access point in the local database (operation 302). The information comprises the known access point's SSID, BSSID, channel, and the time the device last associated with the known access point. For example, while user 110 is at location 140, client 120, her smartphone, associates with known access point 150. Note that, at this point, database 130 contains no information about any access points. In response to the association, database mechanism 206 stores attributes of known access point 150 into an entry newly created in database 130. First, database mechanism 206 stores "home_network" in the SSID attribute. Next, database mechanism 206 stores "01:23:45:67:89:ab" in the BSSID attribute. Next, database mechanism 206 stores "11" in the channel attribute. Finally, database mechanism 206 stores "8:00 AM, Jan. 4, 2010" in the attribute that represents the time client 120 last associated with known access point 150.

While client 120 is associated with known access point 150, scanning mechanism 202 opportunistically scans for other in-range access points (operation 304). Because access points 160-161 neighbor known access point 150, access point 160-161 are close by, allowing scanning mechanism 202 to discover them both. As a result, client 120 knows that access points 160-161 can be in range concurrently with known access point 150 and wants to mark them as proximate access points that are "one hop" away from a known access point. To do so, client 120 stores information for access points 160-161 in database 130 (operation 306). Taking proximate access point 160 as an example, database mechanism 206 first stores "01:23:45:67:89:ac" in the BSSID attribute of a new database entry. Next, database mechanism 206 stores "1" in the channel attribute. Finally, database mechanism 206 stores the BSSID of known access point 150 (which is 01:23:45:67:89:ab) in the neighboring-access-point attribute.

Wi-Fi networks have limited range. When a device moves to another location, the device may exit the range of the known access point the device is currently associated with and lose association (operation 308). For example, when user 110 leaves location 140 to travel to location 141, client 120 quickly moves out of known access point 150's range and loses association. Client 120 then begins scanning for in-range access points at a frequency of $f_{initial}$ in an attempt to discover another known access point to associate with (operation 310).

As user 110 travels to location 141, client 120 enters within range of access point 172 for the first time. Scanning mechanism 202, which is still scanning for access points at a frequency of $f_{initial}$, discovers access point 172 for the first time as user 110 drives by. When scanning mechanism 202 discovers access point 172, client 120 is no longer in range of known access point 150, but is still in range of proximate access point 160. Thus, access point 172 does not neighbor known access point 150, but does neighbor proximate access point 160. Proximate access point 160 is one hop away from a known access point. The fact that h equals two defines a proximate access point to be an access point that is not more than two hops away from a known access point. Access point 172 is only two hops away from known access point 150 because access point 172 is one hop from proximate access point 160 and proximate access point 160 is one hop from known access point 150. Thus, client 120 may mark access point 172 as a proximate access point.

Database mechanism 206 proceeds to store several attributes of proximate access point 172 in a new entry in database 130 (operation 312). First, database mechanism 206 stores "01:23:45:67:89:ad" in the BSSID attribute. Next, database mechanism 206 stores "6" in the channel attribute. Finally, database mechanism 206 stores the BSSID of proximate access point 160, "01:23:45:67:89:ac", in the neighboring-access-point attribute.

A device will not record information for access points that are more than h hops away from a known access point. For example, client 120 will not store information for access points 180-181 because access point 180-181 are, at best, three hops away from known access point 150.

After user 110 travels out of the range of any proximate access points, client 120 progressively reduces the scanning frequency to conserve power.

When user 110 travels back to location 140, client 120 scans for known access points at a frequency of $f_{min}$ because scanning mechanism 202 has not detected any proximate or known access points for a long time. At each scan, client 120 determines whether it is proximate to a known access point (operation 314) and sets the scanning frequency based on this determination (operation 316). When scanning mechanism 202 discovers proximate access point 160, 161, or 172, client 120 will reset the scanning frequency to $f_{initial}$. Finally, when client 120 enters into range of known access point 150, the high scanning frequency of $f_{initial}$ allows client 120 to quickly discover and associate with known access point 150 (operation 318).

Setting the Scanning Frequency

FIG. 4 presents a flow chart that illustrates how the device sets the scanning frequency based on whether the device is proximate to a known access point.

Returning to the above example and assuming that $f_{initial}$ equals one scan every ten seconds, $f_{min}$ equals one scan every ten minutes, and c equals two, user 110 wakes up client 120 during her commute back to location 140. Because client 120 does not know where it is, client 120 sets the scanning frequency to $f_{initial}$ in case a known access point is nearby. However, at this point, user 110 is still 60 miles away from location 140. An access point that is two hops away from a known access point is unlikely to be more than 200 feet from the known access point since the average range of an access point is around 60 feet.[1] Thus, scanning mechanism 202 will not discover a proximate access point until client 120 is very close to location 140, which is far in the future. Regardless, client 120 is unaware of this and will not adjust the scanning frequency just yet.

In performing the scan, scanning mechanism 202 broadcasts a probe request frame over a set of WLAN channels. Scanning mechanism 202 then listens for probe response frames from responding in-range access points and builds up a list of responders. Client 120 is now ready to process the list of responders (terminator 410). For each responder, client 120 performs a database lookup with the responder's BSSID to see if the responder is a known access point or proximate access point (operation 420). However, because client 120 is still far from location 140, none of the responders is proximate to known access point 150. Now that client 120 knows it is not proximate to a known access point (decision 402), client 120 determines that the scanning frequency, which is currently equal to a scan every 10 seconds, is higher than $f_{min}$ (decision 403). Next, client 120 determines if a counter is less than c (decision 404). When client 120 woke up, client 120 set the counter to zero, which is less than c. Thus, client 120 increments the counter (operation 425) and waits until the next scan (terminator 412).

Ten seconds pass. Scanning mechanism 202 performs another scan and increments the counter to two. After ten more seconds pass, scanning mechanism 202 performs a third scan. When scanning mechanism 202 finds no known or proximate access points for the third time, client 120 sees that the counter, having a value of two, is no longer less than c (decision 404). Thus, scanning mechanism 202 reduces the scanning frequency to one scan every 45 seconds (operation 424) and resets the counter to zero (operation 426). After the sixth unsuccessful scan, scanning mechanism 202 reduces the scanning frequency to one scan every two minutes (operation 424). After the ninth unsuccessful scan, the scanning mechanism reduces the scanning frequency to one scan every ten minutes (operation 424). Now that the scanning frequency equals $f_{min}$ (decision 403), scanning mechanism 202 does not reduce the scanning frequency over the next four scans. The fifth scan occurs 59 minutes after client 120 first woke up. Assuming it takes user 110 an hour to travel 60 miles, client 120 may be close to being in range of known access point 150. However, the scanning frequency still equals one scan every ten minutes. This puts client 120 at risk of not associating with known access point 150 until up to ten minutes after coming in range.

Fortunately, client 120 is in range of proximate access point 172. Scanning mechanism 202 performs another scan, to which proximate access point 172 responds. When processing the responders, database mechanism 206 finds that one of the responders matches the BSSID of an entry in the database (decision 402). Client 120 now knows that either a proximate known access point or a known access point is in range. After processing the responding access points for new proximate access points (operation 421, see FIG. 5), client 120 determines that the database entry represents a proximate access point rather than a known access point (decision 401). Now that client 120 knows that it is proximate to a known access point, scanning mechanism 202 restores the scanning frequency to $f_{initial}$ (operation 423) and resets counter to zero (operation 426). Once user 110 reaches location 140 and client 120 is within range of known access point 150, client 120's high scanning frequency allows client 120 to quickly discover and associate with known access point 150 (operation 422). Finally, client 120 ceases scanning for known access points at a set scanning frequency (terminator 411).

Processing in-Range Access Points

FIG. 5 presents a flow chart illustrating how a device populates the device's database with information regarding known access points and proximate access points. Each time the device scans for access points, proximity mechanism 208 determines whether any responding access points are known or proximate access points that have not had information stored in the database.

For example, when user 110 first associates client 120 with known access point 150, database 130 gains an entry for known access point 150. While associated, scanning mechanism 202 continues to scan for in-range access points opportunistically. Access points 160 and 161 neighbor known access point 150. During the first scan, scanning mechanism 202 receives responses from known access point 150 and access points 160 and 161. Because Client 120 is interested in recording information for access points that neighbor known access point 150, client 120 has proximity mechanism 208 process the responding access points (terminator 510). Proximity mechanism 208 iterates over access points 150, 160, and 161. As proximity mechanism 208 processes known access point 150 (operation 520), proximity mechanism 208 sees that known access point 150 is already stored in database 130 (decision 501), finds that there are more access points to process (decision 504), and proceeds to the next discovered access point (operation 520).

While processing access point 160, proximity mechanism 208 sees that access point 160 does not have information stored in database 130 (decision 501). Proximity mechanism 208 then determines that, because client 120 is currently associated with known access point 150, client 120 is in range of a known access point (decision 502). Accordingly, database mechanism 206 stores information for access point 160 in a new entry in database 130 (operation 523) and writes the BSSID of known access point 150 in the neighboring-access-point attribute (operation 524). This information indicates that access point 160 is a proximate access point that is one hop away from a known access point. After recording a similar entry for access point 161, proximity mechanism 208 has no more access points to process (operation 504) and waits until the next scan (terminator 511).

At a later point in time, client 120 is outside the range of known access point 150 and is not associated with a known access point. While client 120 is in range of access point 160, scanning mechanism 202 discovers access point 172. As proximity mechanism 208 processes access point 172 (operation 520), proximity mechanism 208 sees that access point 172 has no information stored in database 130 (decision 501) and that there is no known access point in range (decision 502). However, when proximity mechanism 208 finds that proximate access point 160 is in range, proximity mechanism proceeds to determine whether proximate access point 160 is less than h hops away from a known access point. Note that, in this example, h equals two.

To determine whether a first proximate access point is less than h hops away from a known access point, the device extracts the following from a first database entry associated with the first proximate access point: the BSSID of the access point that the first proximate access point neighbors. If the BSSID refers to a second database entry for a second proximate access point, the device repeats the previous action; the device extracts the following from the database entry associated with the proximate access point: the BSSID of the access point that the second proximate access point neighbors. This repetition continues until the device extracts the following from the database entry of a proximate access point: the BSSID of a known access point. Finally, the number of hops between the first proximate access point and the known access point equals the number of repetitions plus one.

Thus, to determine whether proximate access point 160 is less than two hops from a known access point (decision 503), database mechanism 206 extracts the following from proximate access point 160's database entry: the BSSID of the access point that proximate access point 160 neighbors, which is the BSSID for known access point 150. There were zero repetitions. The number of hops between proximate access point 160 and known access point 150 equals zero plus one, which is one. Thus, proximate access point 160 is less than two hops from a known access point. As a result, database mechanism 206 stores information for access point 172 in a new entry in database 130 (operation 521) and writes the BSSID of proximate access point 160 in the attribute that represents the access point that access point 172 neighbors (operation 522).

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A portable device, comprising:
    an antenna;
    a wireless local area network (WLAN) transceiver coupled to the antenna;
    an interface circuit, coupled to the WLAN transceiver, the interface circuit configured to communicate with other electronic devices through the WLAN transceiver;
    storage hardware for storing a database of access point information; and
    control logic associated with the interface circuit, wherein the control logic is configured to perform the following operations:
        while the portable device is not associated with a known access point, scanning for access points at a scanning frequency, wherein information about known access points is stored in the database;
        during the scanning process, determining whether the portable device is proximate to a known access point, wherein the portable device is proximate to a known access point when an in-range access point neighbors another access point that is at least one hop away from a known access point; and
        setting the scanning frequency based on whether the portable device is proximate to a known access point.

2. The portable device of claim 1, wherein the control logic is further configured to:
    when the portable device associates with an access point for a WLAN, storing information about the access point in the database;
    wherein the information indicates that the access point is a known access point.

3. The portable device of claim 1, wherein the portable device is proximate to a known access point when an in-range access point is a known access point.

4. The portable device of claim 1, wherein the portable device is proximate to a known access point when an in-range access point neighbors a known access point.

5. The portable device of claim 1, wherein the control logic is configured to scan for access points to add to the database, the scanning comprising:
    acquiring responses from access points;
    if the responses include a response from a known access point:
        for any other in-range access point that responds:
            storing or updating information for the in-range access point in the database, wherein the information:
                includes the known access point's BSSID; and
                indicates that the in-range access point is proximate to a known access point; and
    if the responses do not include a response from a known access point but include a response from an access point that is at least one hop away from a known access point:
        for any other in-range access point that responds:
            storing or updating information for the in-range access point in the database, wherein the information:
                includes the BSSID of the access point that is at least one hop away from the known access point; and
                indicates that the in-range access point is a proximate access point.

6. The portable device of claim 5, wherein scanning for access points to add to the database comprises:
   broadcasting probe requests over a set of WLAN channels; and
   receiving probe responses from in-range access points.

7. The portable device of claim 6, wherein the set of WLAN channels comprises WLAN channels which conform to the IEEE 802.11 standard.

8. The portable device of claim 1, wherein setting the scanning frequency in accordance with whether the portable device is proximate to a known access point comprises:
   if the portable device is proximate to a known access point:
      restoring the scanning frequency to an initial scanning frequency $f_{initial}$; and
      setting a counter to 0; and
   if the portable device is not proximate to a known access point and the scanning frequency is greater than a minimum scanning frequency $f_{min}$:
      if the counter is equal to an integer c:
         reducing the scanning frequency; and
         setting the counter to 0; and
      if the counter is less than c, incrementing the counter.

9. The portable device of claim 8, wherein $f_{initial}$, $f_{min}$, and c depend on h.

10. A computer-implemented method for searching for and associating with a wireless access point for a wireless local area network (WLAN), the method comprising:
   while a portable device is not associated with a known access point, scanning for access points at a scanning frequency, wherein information about known access points is stored in a database in the portable device;
   during the scanning process, determining whether the portable device is proximate to a known access point, wherein the portable device is proximate to a known access point when an in-range access point neighbors another access point that is at least one hop away from a known access point; and
   setting the scanning frequency based on whether the portable device is proximate to a known access point.

11. The computer-implemented method of claim 10, further comprising:
   when the portable device associates with an access point for a WLAN, storing information about the access point in the database;
   wherein the information indicates that the access point is a known access point for the WLAN.

12. The computer-implemented method of claim 10, wherein the portable device is proximate to a known access point when an in-range access point is a known access point.

13. The computer-implemented method of claim 10, wherein the portable device is proximate to a known access point when an in-range access point neighbors a known access point.

14. The computer-implemented method of claim 10, further comprising scanning for access points to add to the database, the scanning comprising:
   acquiring responses from access points;
   if the responses include a response from a known access point:
      for any other in-range access point that responds:
         storing or updating information for the in-range access point in the database, wherein the information:
            includes the known access point's BSSID; and
            indicates that the in-range access point is proximate to a known access point; and
   if the responses do not include a response from a known access point but include a response from an access point that is less than h hops at least one hop away from a known access point:
      for any other in-range access point that responds:
         storing or updating information for the in-range access point in the database, wherein the information:
            includes the BSSID of the access point that is at least one hop away from the known access point; and
            indicates that the in-range access point is a proximate access point.

15. The computer-implemented method of claim 14, wherein scanning for access points to add to the database comprises:
   broadcasting probe requests over a set of WLAN channels; and
   receiving probe responses from in-range access points.

16. The computer-implemented method of claim 15, wherein the set of WLAN channels comprises WLAN channels which conform to the IEEE 802.11 standard.

17. The computer-implemented method of claim 10, wherein setting the scanning frequency in accordance with whether the portable device is proximate to a known access point comprises:
   if the portable device is proximate to a known access point:
      restoring the scanning frequency to an initial scanning frequency $f_{initial}$; and
      setting a counter to 0; and
   if the portable device is not proximate to a known access point and the scanning frequency is greater than a minimum scanning frequency $f_{min}$:
      if the counter is equal to an integer c:
         reducing the scanning frequency; and
         setting the counter to 0; and
      if the counter is less than c, incrementing the counter.

18. The computer-implemented method of claim 17, wherein $f_{initial}$, $f_{min}$, and c depend on h.

19. A non-transitory computer-program product for use in conjunction with a computer system, the computer-program product comprising a computer-readable storage medium and a computer-program mechanism embedded therein for configuring the computer system to search for and associate with a wireless access point for a wireless local area network (WLAN), the computer-program mechanism including:
   instructions for, while the portable device is not associated with a known access point, scanning for access points at a scanning frequency, wherein information about known access points is stored in a database in the portable device;
   instructions for, during the scanning process, determining whether the portable device is proximate to a known access point, wherein the portable device is proximate to a known access point when an in-range access point neighbors another access point that is at least one hop away from a known access point; and
   instructions for, setting the scanning frequency based on whether the portable device is proximate to a known access point, the setting comprising configuring the scanning frequency to conserve battery power but enable timely association with in-range known access points.

20. The computer-program product of claim 19, wherein the computer-program mechanism further includes:
instructions for, when the portable device associates with an access point for a WLAN, storing information about the access point in the database;
wherein the information indicates that the access point is a known access point for the WLAN.

21. The computer program product of claim 20, wherein the portable device is proximate to a known access point when an in-range access point is a known access point.

22. The computer program product of claim 20, wherein the portable device is proximate to a known access point when an in-range access point neighbors a known access point.

23. The computer program product of claim 20, wherein the computer-program mechanism further includes instructions for scanning for access points to add to the database, the scanning comprising:
acquiring responses from access points;
if the responses include a response from a known access point:
for any other in-range access point that responds:
storing or updating information for the in-range access point in the database, wherein the information:
includes the known access point's BSSID; and
indicates that the in-range access point is proximate to a known access point; and
if the responses do not include a response from a known access point but include a response from an access point that is at least one hop away from a known access point:
for any other in-range access point that responds:
storing or updating information for the in-range access point in the database, wherein the information:
includes the BSSID of the access point that is at least one hop away from the known access point; and
indicates that the in-range access point is a proximate access point.

* * * * *